(12) United States Patent
King et al.

(10) Patent No.: US 6,784,141 B1
(45) Date of Patent: Aug. 31, 2004

(54) METHODS, AQUEOUS WELL TREATING FLUIDS AND FRICTION REDUCERS THEREFOR

(75) Inventors: Karen L. King, Duncan, OK (US); David E. McMechan, Duncan, OK (US); Jiten Chatterji, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/419,455

(22) Filed: Apr. 21, 2003

(51) Int. Cl.$^7$ .............................. C09K 7/02; C11D 3/38
(52) U.S. Cl. ...................... 507/222; 507/120; 507/922; 508/470; 508/471; 166/308.2
(58) Field of Search ................ 507/222, 120, 507/922; 508/470, 471; 166/308.2

(56) References Cited

U.S. PATENT DOCUMENTS

| | | | | |
|---|---|---|---|---|
| 3,748,266 A | | 7/1973 | Malone et al. ............. | 252/8.55 |
| 3,758,406 A | | 9/1973 | Malone et al. ............. | 252/8.55 |
| 4,137,969 A | * | 2/1979 | Phalangas et al. ........ | 166/270.1 |
| 4,152,274 A | * | 5/1979 | Phillips et al. ............. | 507/222 |
| 4,626,363 A | * | 12/1986 | Gleason et al. ............ | 507/118 |
| 4,861,499 A | * | 8/1989 | Neff et al. .................. | 507/225 |
| 5,762,140 A | | 6/1998 | Hardy et al. ............... | 166/295 |
| 6,169,058 B1 | * | 1/2001 | Le et al. ..................... | 507/222 |
| 6,355,600 B1 | * | 3/2002 | Norfleet et al. ............ | 507/120 |
| 6,413,433 B1 | * | 7/2002 | Maury et al. ............... | 210/714 |
| 6,517,677 B1 | * | 2/2003 | Cardile et al. ........... | 162/168.3 |
| 6,627,719 B2 | * | 9/2003 | Whipple et al. ............ | 526/319 |
| 6,702,044 B2 | * | 3/2004 | Reddy et al. ................ | 175/64 |
| 2002/0165307 A1 | * | 11/2002 | Huang et al. ............... | 524/458 |
| 2003/0191030 A1 | * | 10/2003 | Blair et al. ................. | 507/225 |

* cited by examiner

*Primary Examiner*—Philip C. Tucker
(74) *Attorney, Agent, or Firm*—Robert A. Kent; C. Clark Dougherty, Jr.

(57) ABSTRACT

The present invention relates to methods, aqueous treating fluids and friction pressure reducers for the treating fluids. A treating fluid of the invention comprises water and a non-toxic environmentally acceptable friction pressure reducer comprising a mixture of a copolymer of acrylamide and dimethylaminoethyl acrylate quaternized with benzyl chloride and a stabilizing and dispersing homopolymer of ethanaminium,N,N,N-trimethyl-2-[(1,oxo-2-prbpenyl)oxy]-chloride.

20 Claims, No Drawings

METHODS, AQUEOUS WELL TREATING FLUIDS AND FRICTION REDUCERS THEREFOR

BACKGROUND OF THE INVENTION

1. Field of the Invention

The present invention relates to friction pressure reducers for use in aqueous treating fluids.

2. Description of the Prior Art

In the drilling, completion and stimulation of oil and gas wells, aqueous well treating fluids are often pumped through tubular goods disposed in well bores. In order to reduce the friction between the aqueous treating fluid and the tubular goods during pumping whereby the pressure at the pump is reduced, friction pressure reducing additives have heretofore been combined with the aqueous treating fluids.

For example, a treatment commonly utilized for stimulating hydrocarbon production from a subterranean zone penetrated by a well bore is hydraulic fracturing. In most hydraulic fracturing treatments, an aqueous treating fluid referred to in the art as a pad fluid is pumped through tubular goods disposed in the well bore into the subterranean zone to be stimulated at a rate and pressure such that fractures are formed and extended in the subterranean zone. Thereafter, a viscosified aqueous fluid having proppant particles suspended therein is pumped into the fractures so that the proppant particles suspended therein are deposited in the fractures when the viscous aqueous fluid is broken and recovered. The proppant particles function to prevent the fractures from closing whereby conductive channels are formed through which produced fluids can flow to the well bore.

While the aqueous pad fluids and other aqueous well treating fluids containing friction pressure reducers utilized heretofore have been used successfully, the friction pressure reducers have been suspended in a hydrocarbon-water emulsion and as a result they have been toxic and detrimental to the environment. Thus, there are needs for improved friction pressure reducers which are non-toxic and environmentally acceptable.

SUMMARY OF THE INVENTION

The present invention provides improved methods of treating subterranean zones penetrated by well bores, improved aqueous well treating fluids and non-toxic environmentally acceptable friction reducers which meet the needs described above and overcome the deficiencies of the prior art. A method of this invention for treating a subterranean zone penetrated by a well bore comprises the following steps. An aqueous treating fluid that comprises water and a non-toxic environmentally acceptable friction pressure reducer is prepared or provided. The friction pressure reducer comprises a mixture of a copolymer of acrylamide and dimethylaminoethyl acrylate quaternized with benzyl chloride and a stabilizing and dispersing homopolymer of ethanaminium,N,N,N-trimethyl-2-[(1,oxo-2-propenyl)oxy]-chloride. Thereafter, the aqueous treating fluid is pumped into the subterranean zone.

An aqueous well treating fluid of this invention is basically comprised of water and a non-toxic environmentally acceptable friction pressure reducer comprising a mixture of a copolymer of acrylamide and dimethylaminoethyl acrylate quaternized with benzyl chloride and a stabilizing and dispersing homopolymer of ethanaminium,N,N,N-methyl-2-[(1,oxo-2-propenyl)oxy]-chloride.

A non-toxic environmentally acceptable water friction pressure reducer of this invention comprises a mixture of a copolymer of acrylamide and dimethylaminoethyl acrylate quaternized with benzyl chloride and a stabilizing and dispersing homopolymer of ethanaminium,N,N,N-trimethyl-2-[(1,oxo-2-propenyl)oxy]-hloride.

The objects, features and advantages of the present invention will be readily parent to those skilled in the art upon a reading of the description of preferred embodiments which follows.

DESCRIPTION OF PREFERRED EMBODIMENTS

As mentioned above, the present invention provides methods of treating a subterranean zone penetrated by a well bore comprising the steps of preparing or providing an aqueous treating fluid that comprises water and a non-toxic environmentally acceptable friction pressure reducer and then pumping the aqueous treating fluid into the subterranean zone. An aqueous well treating fluid is also provided comprising water and a non-toxic environmentally acceptable friction pressure reducer as is the friction pressure reducer.

The water utilized in the aqueous treating fluid can be fresh water or salt water. The term "salt water" is used herein to mean unsaturated salt solutions, saturated salt solutions and brines.

The non-toxic environmentally acceptable friction pressure reducer of this invention comprises a mixture of a copolymer of acrylamide and dimethylaminoethyl acrylate quaternized with benzyl chloride and a stabilizing and dispersing homopolymer of ethanaminium,N,N,N-trimethyl-2-[(1,oxo-2-propenyl)oxy]-chloride. The acrylamide is present in the copolymer in an amount in the range of from about 90 weight % to about 95 weight % and the dimethylaminoethyl acrylate quaternized with benzyl chloride is present in the copolymer in an amount in the range of from about 5 weight % to about 10 weight %. More preferably, the acrylamide is present in the copolymer in an amount of about 93 weight % and the dimethylaminoethyl acrylate quaternized with benzyl chloride is present in the copolymer in an amount of about 7 weight %. The copolymer of acrylamide and dimethylaminoethyl acrylate quaternized with benzyl chloride is present in the mixture in an amount of about 96 weight % and the stabilizing and dispersing homopolymer of ethanaminium,N,N,N-trimethyl-2-[(1,oxo-2-propenyl)oxy-chloride is present in the mixture in an amount of about 4 weight %.

The friction pressure reducer mixture is included in the aqueous treating fluid in an amount in the range of from about 0.1 gallon to about 10 gallons per 1000 gallons of water therein, more preferably in an amount of about 2 gallons per 1000 gallons.

A method of this invention for treating a subterranean zone penetrated by a well bore comprises the following steps. An aqueous treating fluid that comprises water and a non-toxic environmentally acceptable friction pressure reducer is prepared or provided. The friction pressure reducer is comprised of a mixture of a copolymer of acrylamide and dimethylaminoethyl acrylate quaternized with benzyl chloride and a stabilizing and dispersing homopolymer of ethanaminium,N,N,N-trimethyl-2-[(1,oxo-2-propenyl)oxy]-chloride. Thereafter, the aqueous treating fluid is pumped into the subterranean zone.

The aqueous well treating fluid of this invention is comprised of water and the non-toxic environmentally acceptable friction pressure reducer described above.

The non-toxic environmentally acceptable water friction pressure reducer of this invention is comprised of the mixture described above.

A preferred method of this invention for treating a subterranean zone penetrated by a well bore comprises the steps of: (a) preparing or providing an aqueous treating fluid that comprises water and a non-toxic environmentally acceptable friction pressure reducer comprising a mixture of a copolymer of acrylamide and dimethylaminoethyl acrylate quaternized with benzyl chloride and a stabilizing and dispersing homopolymer ethanaminium,N,N,N-trimethyl-2-[(1,oxo-2-propenyl)oxy]-chloride; and (b) pumping the aqueous treating fluid into the subterranean zone.

A preferred aqueous well treating fluid of this invention comprises: water; and a on-toxic environmentally acceptable friction pressure reducer comprising a mixture of copolymer of acrylamide and dimethylaminoethyl acrylate quaternized with benzyl hloride and a stabilizing and dispersing homopolymer of ethanaminium,N,N,N-trimethyl-2-[(1,oxo-2-propenyl)oxy]-chloride.

A preferred non-toxic environmentally acceptable water friction pressure reducer comprises a mixture of a copolymer of acrylamide and dimethylaminoethyl acrylate quaternized with benzyl chloride and a stabilizing and dispersing homopolymer of ethanaminium,N,N,N-trimethyl-2-[(1,oxo-2-propenyl)oxy]-chloride.

In order to further illustrate the methods and fracturing fluids of the present invention, the following examples are given.

EXAMPLE 1

The friction pressure reducer of this invention was prepared as follows. A three-necked flask equipped with a stirrer, an inlet nitrogen purging tube and a condenser was charged with 52 grams of deionized water. To the water, 18 grams of ammonium sulfate, 7.5 grams of sodium sulfate and 2 grams of glycerol were added. The salt solution formed was continuously agitated. 15.35 grams of acrylamide, 1.15 grams of dimethylaminoethyl acrylate quaternized with benzyl chloride and 4 grams of a stabilizing and dispersing homopolymer of ethanaminium,N,N,N-trimethyl-2-[(1,oxo-2-propenyl)oxy]-chloride were then added to the salt solution while the solution was being stirred. 0.1 gram of napthol ethyl ether surfactant and less than 0.1 grams of vazo initator, i.e., 1H-imidazole,2,2'-(azobis91-methylethylidene)bis(4,5-dihydro-dihydrochloride) were then added to the stirring solution. The solution was maintained at a temperature of from about 40° C. to about 45° C. with continuous nitrogen purging. When the oxygen was completely displaced, the polymerization initiated as indicated by the increasing viscosity of the solution and the production of exothermic heat. The solution was held at in the range of from 75° to 80° C. for about two hours. Thereafter, the reaction was terminated by raising the temperature to 95° C. and holding that temperature for one hour. The copolymer and homopolymer product mixture had a specific gravity of 1.15 plus or minus 0.05 at 60° F. and the liquid product had a milky white appearance.

Portions of the above described friction pressure reducer product were added to portions of fresh water, a 2% KCl solution, a 10% NaCl solution and synthetic brine and tested for friction pressure reduction. A small scale friction pressure reduction measurement apparatus was used comprised of a transducer connected to a 6 foot long pipe. The inlet of the transducer was 2 feet from the inlet end of the pipe. The inside diameter of the measurement tube connected between the pipe and the transducer was 0.48 inches. The outlet end of the 6 foot long pipe (4 feet) was attached to a reservoir tank through a nipple which had a diameter of 1 inch. The reservoir tank held a total of 10 liters of the base liquid to which the friction pressure reducing mixture would be added. Two preliminary pressure measurements of the base fluid were required before the friction reduction agent was tested. The first measurement (Ph) was taken with the pump stopped for 10 seconds. The pump was then started and the second base fluid measurement (Pb) was made to establish a 0% reduction. After 60 seconds, the friction pressure reducer terpolymer was introduced into the base fluid and the pressure (Ps) was monitored for a total test time of 20 minutes after which the test was terminated. The friction pressure reduction (FR) obtained was calculated as a function of time in accordance with the equation below.

$$FR\% = \frac{Pb - Ps}{Pb - Ph} \times 100$$

wherein:

Pb=FR Meter gage indication while pumping the base fluid.

Ps=FR Meter gage indication while pumping the fluid sample which contains the friction pressure reducer terpolymer.

Ph=FR Meter gage indication with the pump stopped which represents the hydrostatic pressure.

The results of the tests utilizing fresh water as the base fluid is set forth in Table I below.

TABLE I

FRICTION PRESSURE REDUCTION OF FRESH WATER

| Friction Pressure Reducer Concentration gal/M gal | Initial Temperature ° F. | % Friction Pressure Reduction after 5 minutes | % Friction Pressure Reduction after 20 minutes |
|---|---|---|---|
| 0.25 | 72 | 65 | 54 |
| 0.5 | 68 | 64 | 64 |
| 2 | 65 | 61 | 60 |

EXAMPLE 2

The tests described in Example 1 above were repeated utilizing a 2% by weight solution of potassium chloride in fresh water. The results of these tests are given in Table II below.

TABLE II

FRICTION PRESSURE REDUCTION OF 2% KCl

| Friction Pressure Reducer Concentration gal/M gal | Initial Temperature ° F. | % Friction Pressure Reduction after 5 minutes | % Friction Pressure Reduction after 20 minutes |
|---|---|---|---|
| 0.25 | 72 | 65 | 54 |
| 0.5 | 68 | 64 | 64 |
| 2 | 65 | 61 | 60 |

EXAMPLE 3

The tests described in Example 1 were repeated utilizing a 10% by weight solution of sodium chloride in fresh water. The results of these tests are set forth in Table III below.

TABLE III

FRICTION PRESSURE REDUCTION OF 10% NaCl

| Friction Pressure Reducer Concentration gal/M gal | Initial Temperature °F. | % Friction Pressure Reduction after 5 minutes | % Friction Pressure Reduction after 20 minutes |
|---|---|---|---|
| 0.5 | 69 | 61 | 53 |
| 2 | 67 | 57 | 58 |

EXAMPLE 4

The tests described in Example 1 above were repeated utilizing a synthetic brine solution. The synthetic brine solution utilized was comprised of 10 liters of fresh water having the following compounds dissolved therein in the following amounts: sodium chloride—1591.1 grams; calcium chloride—635.48 grams; magnesium chloride—50.27 grams; potassium chloride—39.8 grams; barium chloride—0.288 grams; strontium sulfate—4.6 grams; strontium chloride—21.9 grams; and sodium carbonate—0.3 grams. The synthetic brine had a pH of 5.42. The results of these tests are given in Table IV below.

TABLE IV

FRICTION PRESSURE REDUCTION OF BRINE SOLUTION

| Friction Pressure Reducer Concentration gal/M gal | Initial Temperature °F. | % Friction Pressure Reduction after 5 minutes | % Friction Pressure Reduction after 20 minutes |
|---|---|---|---|
| 0.5 | 85 | 54 | 39 |
| 0.75 | 83 | 56 | 44 |
| 1 | 81 | 58 | 47 |

From the results set forth in Tables I–IV above it can be seen that the friction pressure reducer of the present invention provided excellent friction pressure reduction in fresh water, a 2% solution of potassium chloride, a 10% solution of sodium chloride and a synthetic brine solution.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of treating a subterranean zone penetrated by a well bore comprising the steps of:
   (a) preparing or providing an aqueous treating fluid that comprises water and a non-toxic environmentally acceptable friction pressure reducer comprising a mixture of a copolymer of acrylamide and dimethylaminoethyl acrylate quaternized with benzyl chloride and a stabilizing and dispersing homopolymer of ethanaminium,N,N,N-trimethyl-2-[(1,oxo-2-propenyl)oxy]-chloride; and
   (b) pumping said aqueous treating fluid into said subterranean zone.

2. The method of claim 1 wherein said water is selected from the group consisting of fresh water and salt water.

3. The method of claim 1 wherein said acrylamide is present in said copolymer in an amount in the range of from about 90 weight % to about 95 weight % and said dimethylaminoethyl acrylate quaternized with benzyl chloride is present in said copolymer in an amount in the range of from about 5 weight % to about 10 weight %.

4. The method of claim 1 wherein said acrylamide is present in said copolymer in an amount of about 93 weight % and said dimethylaminoethyl acrylate quaternized with benzyl chloride is present in said copolymer in an amount of about 7 weight %.

5. The method of claim 1 wherein said copolymer of acrylamide and dimethylaminoethyl acrylate quaternized with benzyl chloride is present in said mixture in an amount of about 96 weight % and said stabilizing and dispersing homopolymer of ethanaminium,N,N,N-trimethyl-2-[(1,oxo-2-propenyl)oxy]-chloride is present in said mixture in an amount of about 4 weight %.

6. The method of claim 1 wherein said friction pressure reducer is present in said aqueous treating fluid in an amount in the range of from about 0.1 gallon to about 10 gallons per 1000 gallons of water therein.

7. The method of claim 1 wherein said friction pressure reducer is present in said aqueous treating fluid in an amount of about 2 gallons per 1000 gallons of water therein.

8. The method of claim 1 wherein said aqueous treating fluid is a pad fluid utilized in a subterranean zone fracturing treatment.

9. An aqueous well treating fluid comprising:
   water; and
   a non-toxic environmentally acceptable friction pressure reducer comprising a mixture of a copolymer of acrylamide and dimethylaminoethyl acrylate quaternized with benzyl chloride and a stabilizing and dispersing homopolymer of ethanaminium,N,N,N-trimethyl-2-[(1,oxo-2-propenyl)oxy]-chloride.

10. The treating fluid of claim 9 wherein said water is selected from the group consisting of fresh water and salt water.

11. The treating fluid of claim 9 wherein said acrylamide is present in said copolymer in an amount in the range of from about 90 weight % to about 95 weight % and said dimethylaminoethyl acrylate quaternized with benzyl chloride is present in said copolymer in an amount in the range of from about 5 weight % to about 10 weight %.

12. The treating fluid of claim 9 wherein said acrylamide is present in said copolymer in an amount of about 93 weight % and said dimethylaminoethyl acrylate quaternized with benzyl chloride is present in said terpolymer in an amount of about 7 weight %.

13. The treating fluid of claim 9 wherein said copolymer of acrylamide and dimethylaminoethyl acrylate quaternized with benzyl chloride is present in said mixture in an amount of about 96 weight % and said stabilizing and dispersing homopolymer of ethanaminium,N,N,N-trimethyl-2-[(1,oxo-2-propenyl)oxy]-chloride is present in said mixture in an amount of about 4 weight %.

14. The treating fluid of claim 9 wherein said friction pressure reducer is present in said aqueous treating fluid in an amount in the range of from about 0.1 gallon to about 10 gallons per 1000 gallons of water therein.

15. The treating fluid of claim 9 wherein said friction pressure reducer is present in said aqueous treating fluid in an amount of about 2 gallons per 1000 gallons of water therein.

16. The treating fluid of claim 9 wherein said aqueous treating fluid is a pad fluid utilized in a subterranean zone fracturing treatment.

17. A non-toxic environmentally acceptable friction pressure reducer comprising a mixture of copolymer of acrylamide and dimethylaminoethyl acrylate quaternized with benzyl chloride and a stabilizing and dispersing homopolymer of ethanaminium,N,N,N-trimethyl-2-[(1,oxo-2-propenyl)oxy]-chloride.

18. The friction pressure reducer of claim 17 wherein said acrylamide is present in said copolymer in an amount in the range of from about 90 weight % to about 95 weight % and said dimethylaminoethyl acrylate quaternized with benzyl chloride is present in said copolymer in an amount in the range of from about 5 weight % to about 10 weight %.

19. The friction pressure reducer of claim 17 wherein said acrylamide is present in said copolymer in an amount of about 93 weight % and said dimethylaminoethyl acrylate quaternized with benzyl chloride is present in said copolymer in an amount of about 7 weight %.

20. The friction pressure reducer of claim 17 wherein said copolymer of acrylamide and dimethylaminoethyl acrylate quaternized with benzyl chloride is present in said mixture in an amount of about 96 weight % and said stabilizing and dispersing homopolymer of ethanaminium,N,N,N-trimethyl-2-[(1,oxo-2-propenyl)oxy]-chloride is present in said mixture in an amount of about 4 weight %.

* * * * *